US011633726B2

(12) United States Patent
Petrovic et al.

(10) Patent No.: US 11,633,726 B2
(45) Date of Patent: Apr. 25, 2023

(54) ZEOLITE WITH REDUCED EXTRA-FRAMEWORK ALUMINUM

(71) Applicant: BASF Corporation, Florham Park, NJ (US)

(72) Inventors: Ivan Petrovic, Princeton, NJ (US); Subramanian Prasad, Edison, NJ (US); Joseph Palamara, Rahway, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 16/810,996

(22) Filed: Mar. 6, 2020

(65) Prior Publication Data

US 2020/0206723 A1  Jul. 2, 2020

Related U.S. Application Data

(63) Continuation of application No. PCT/IB2018/056818, filed on Sep. 6, 2018.

(60) Provisional application No. 62/555,215, filed on Sep. 7, 2017.

(51) Int. Cl.

| B01D 53/94 | (2006.01) |
|---|---|
| B01J 29/76 | (2006.01) |
| B01J 35/04 | (2006.01) |
| F01N 3/20 | (2006.01) |
| F01N 13/16 | (2010.01) |

(52) U.S. Cl.
CPC .......... *B01J 29/763* (2013.01); *B01D 53/944* (2013.01); *B01D 53/9418* (2013.01); *B01D 53/9477* (2013.01); *B01J 35/04* (2013.01); *F01N 3/2066* (2013.01); *F01N 13/16* (2013.01); *B01D 2255/20761* (2013.01); *B01D 2255/50* (2013.01); *B01J 2229/186* (2013.01); *F01N 2330/00* (2013.01); *F01N 2370/04* (2013.01); *F01N 2610/02* (2013.01)

(58) Field of Classification Search
None
See application file for complete search history.

(56) References Cited

U.S. PATENT DOCUMENTS

| 4,544,538 A | 10/1985 | Zones et al. | |
|---|---|---|---|
| 5,118,482 A * | 6/1992 | Narayana | B01J 20/186 423/713 |
| 5,879,433 A * | 3/1999 | Gallup | B01D 53/1456 95/186 |
| 6,709,644 B2 | 3/2004 | Zones et al. | |
| 7,601,662 B2 | 10/2009 | Bull et al. | |
| 8,293,198 B2 | 10/2012 | Beutel et al. | |
| 8,715,618 B2 | 5/2014 | Trukhan et al. | |
| 8,883,119 B2 | 11/2014 | Bull et al. | |
| 9,138,732 B2 | 9/2015 | Bull et al. | |
| 9,162,218 B2 | 10/2015 | Bull et al. | |
| 2002/0132724 A1* | 9/2002 | Labarge | B01J 23/34 502/340 |
| 2003/0050182 A1 | 3/2003 | Tran et al. | |
| 2010/0172814 A1 | 7/2010 | Bull et al. | |
| 2014/0079616 A1 | 3/2014 | Fedeyko et al. | |
| 2015/0290632 A1* | 10/2015 | Lambert | B01J 29/88 423/705 |
| 2016/0038929 A1 | 2/2016 | Kolb et al. | |
| 2016/0107119 A1* | 4/2016 | Peden | B01J 37/08 423/700 |
| 2017/0304809 A1 | 10/2017 | Nesterenko | |
| 2018/0043305 A1* | 2/2018 | Voss | B01D 53/9418 |
| 2018/0133650 A1 | 5/2018 | Usui | |

FOREIGN PATENT DOCUMENTS

| CA | 2955123 | * | 7/2015 |
|---|---|---|---|
| EP | 2 308 596 A1 | | 4/2011 |
| EP | 2776369 A1 | | 9/2014 |
| EP | 2308596 B1 | | 9/2016 |
| JP | 2009-519817 A | | 5/2009 |
| JP | 2014-515701 A | | 7/2014 |
| JP | 2015-511919 A | | 4/2015 |
| JP | 2016-216279 A | | 12/2016 |
| KR | 10-2008-0081031 | | 9/2008 |
| WO | 2007/070639 A2 | | 6/2007 |
| WO | WO2008/106519 A1 | | 9/2008 |
| WO | WO2011/113834 A1 | | 9/2011 |
| WO | WO 2012138405 A1 | | 10/2012 |
| WO | WO2016/046296 A1 | | 3/2016 |
| WO | WO 2016/138418 | | 9/2016 |
| WO | WO2017/034920 A1 | | 3/2017 |
| WO | WO 17100384 A1 | | 6/2017 |
| WO | WO 2017/134581 A1 | | 8/2017 |

OTHER PUBLICATIONS

Su, et al. "Correlation of the changes in the framework and active Cu sites . . . " Phys. Chem. 17, 29142 (2015). (Year: 2015).*
Buzimov, et al. "Effect of mechanical treatment on properties . . . " Journal of Physics Conf. Ser. 790, (Year: 2017).*
2nd International Conference on Rheology and Modeling of Materials (IC-RMM2) (Year: 2017).*
Burton, A., "The Discovery, Structure Elucidation, and Characterization of Zeolite EMM-23: A Highly Unusual Zeolite", Catalysis Society of Metropolitan New York, 2017 Annual Symposium Abstract, 2017, 22.
Fyfe et al., "Solid-State NMR Detection, Characterization, and Quanification of the Multiple Aluminum Environments in US-Y Catalysts by $^{27}$Al MAS and MQMAS Experiments at Very High Field", *J. Am. Chem. Soc.* 2001, 123, 5285-5291.
Guo et al., "Accurate structure determination of a borosilicate zeolite EMM-26 with two-dimensional 10 × 10 ring channels using rotation electron diffraction", Inorg. Chem. Front., 2016, 3, 1444.
Bokhoven, et al.; "Stepwise Dealumination of Zeolite Beta at Specific T-Sites Observed with $^{27}$ Al MAS and $^{27}$ Al MQ MAS NMR"; J. Am. Chem. Soc. 2000, 122, 12842-12847.
Office Action from corresponding Chinese Patent Application No. 201880071603.7 dated Dec. 28, 2022, and its English translation.
Notice of Preliminary Rejection from corresponding Korean Patent Application No. 10-2020-7009946 dated Feb. 2, 2023, and a machine generated English Translation and explanation of action.
Decision on Refusal from corresponding Japanese Patent Application No. 2020-214177 dated Feb. 7, 2023, and its English translation.

* cited by examiner

*Primary Examiner* — Sheng H Davis
(74) *Attorney, Agent, or Firm* — DLA Piper LLP (US)

(57) ABSTRACT

The present disclosure generally provides a catalyst composition comprising a zeolite containing iron and/or copper with a reduced amount of extra-framework aluminum. The catalyst composition is useful to catalyze the reduction of nitrogen oxides in exhaust gas in the presence of a reductant.

23 Claims, 3 Drawing Sheets

ZEOLITE WITH REDUCED EXTRA-FRAMEWORK ALUMINUM

CROSS-REFERENCE TO RELATED APPLICATIONS

This application is a continuation of International Application No. PCT/IB2018/056818; filed Sep. 6, 2018, which International Application was published by the International Bureau in English on Mar. 14, 2019, and which claims priority to U.S. Provisional Application No. 62/555,215; filed Sep. 7, 2017, the content of each of which is hereby incorporated by reference in its entirety.

FIELD OF THE INVENTION

The present invention relates generally to the field of selective catalytic reduction catalysts and to methods of preparing and using such catalysts to selectively reduce nitrogen oxides.

BACKGROUND OF THE INVENTION

Over time, the harmful components of nitrogen oxides ($NO_x$) have led to atmospheric pollution. $NO_x$ is contained in exhaust gases, such as from internal combustion engines (e.g., in automobiles and trucks), from combustion installations (e.g., power stations heated by natural gas, oil, or coal), and from nitric acid production plants.

Various treatment methods have been used for the treatment of $NO_x$-containing gas mixtures to decrease atmospheric pollution. One type of treatment involves catalytic reduction of nitrogen oxides. There are two processes: (1) a nonselective reduction process wherein carbon monoxide, hydrogen, or a lower hydrocarbon is used as a reducing agent; and (2) a selective reduction process wherein ammonia or an ammonia precursor is used as a reducing agent. In the selective reduction process, a high degree of nitrogen oxide removal can be achieved with a small amount of reducing agent.

The selective reduction process is referred to as a SCR (Selective Catalytic Reduction) process. The SCR process uses catalytic reduction of nitrogen oxides with a reductant (e.g., ammonia) in the presence of atmospheric oxygen, resulting in the formation predominantly of nitrogen and steam:

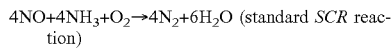
4NO+4NH$_3$+O$_2$→4N$_2$+6H$_2$O (standard SCR reaction)

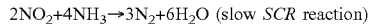
2NO$_2$+4NH$_3$→3N$_2$+6H$_2$O (slow SCR reaction)

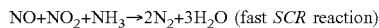
NO+NO$_2$+NH$_3$→2N$_2$+3H$_2$O (fast SCR reaction)

Catalysts employed in the SCR process ideally should be able to retain good catalytic activity over a wide range of temperature conditions of use, for example, 200° C. to 600° C. or higher, under hydrothermal conditions. SCR catalysts are commonly employed in hydrothermal conditions, such as during the regeneration of a soot filter, a component of the exhaust gas treatment system used for the removal of particles.

Molecular sieves such as zeolites have been used in the selective catalytic reduction of nitrogen oxides with a reductant such as ammonia, urea, or a hydrocarbon in the presence of oxygen. Zeolites are crystalline materials having rather uniform pore sizes which, depending upon the type of zeolite and the type and amount of cations included in the zeolite lattice, range from about 3 to about 10 Angstroms in diameter. Certain zeolites having 8-ring pore openings and double-six ring secondary building units, particularly those having cage-like structures, have been used as SCR catalysts. A specific type of zeolite having these properties is chabazite (CHA), which is a small pore zeolite with 8 member-ring pore openings (~3.8 Angstroms) accessible through its 3-dimensional porosity. A cage-like structure results from the connection of double six-ring building units by 4 rings.

Metal-promoted zeolite catalysts also often referred to as ion-exchanged zeolites or zeolites supported with copper and/or iron including, among others, copper-promoted and iron-promoted zeolite catalysts, for the selective catalytic reduction of nitrogen oxides with ammonia are known and can typically be prepared via metal ion-exchange processes. For example, iron-promoted zeolite beta has been an effective commercial catalyst for the selective reduction of nitrogen oxides with ammonia. Unfortunately, it has been found that under harsh hydrothermal conditions (e.g., as exhibited during the regeneration of a soot filter with temperatures locally exceeding 700° C.), the activity of many metal-promoted zeolites begins to decline. This decline in activity is believed to be due to destabilization of the zeolite such as by dealumination and consequent reduction of metal-containing catalytic sites within the zeolite. To maintain the overall activity of NO reduction, increased levels of the copper and/or iron promoted zeolite catalyst must be provided.

A large number of SCR catalysts currently suffer from one or both of the following defects: (1) poor conversion of oxides of nitrogen at low temperatures, for example 350° C. and lower; and (2) poor hydrothermal stability marked by a significant decline in catalytic activity in the conversion of oxides of nitrogen by SCR. Metal-promoted, particularly copper-promoted, aluminosilicate zeolites having the CHA structure type have solicited a high degree of interest as catalysts for the SCR of oxides of nitrogen in lean burning engines using nitrogenous reductants. These materials exhibit activity within a wide temperature window and excellent hydrothermal durability, as described in U.S. Pat. No. 7,601,662, which is thereby incorporated by reference in its entirety.

Emission regulation continues to become increasingly more stringent and therefore developing improved $NO_x$ conversion catalysts with increasing hydrothermal stability and catalytic activity over a broad temperature range is an ongoing effort.

SUMMARY OF THE INVENTION

The present disclosure generally provides SCR catalyst compositions comprising copper-containing chabazite (CHA) zeolite material used in engine treatment systems for the abatement of $NO_x$. In particular, the disclosed copper-containing chabazite (CHA) zeolite material comprises a generally low amount of extra-framework aluminum atoms present in the zeolite material. The amount of extra-framework aluminum atoms present in zeolite materials has been associated with a decrease in catalytic activity of such materials in the abatement of engine exhaust gases. The present disclosure provides zeolite materials whereby the generation of extra-framework aluminum atoms in zeolite materials can be minimized.

Typically extra-framework aluminum atoms are generated when the zeolite material is exposed to high temperatures either during preparation (i.e., calcining) or during use in an engine emission treatment system. The present disclosure provides metal-containing chabazite (CHA) zeolite materials, with a reduced amount of extra-framework aluminum atoms, which can be prepared by modifying calcination procedures to require lower temperatures, chemical pretreatments (i.e., peroxides), and/or changes in calcination atmosphere. The disclosed modified calcination procedures render zeolite materials with higher copper loadings, improved hydrothermal stability, and better NO conversion activity.

One aspect of the invention is directed to an SCR catalyst composition comprising a metal-containing molecular sieve comprising a zeolitic framework of silicon and aluminum atoms and extra-framework aluminum atoms that are present in an amount of less than 15% based on the total integrated peak intensity determined by $^{27}Al$ NMR of aluminum species present in the zeolite as measured prior to addition of the metal. In some embodiments, the extra framework aluminum atoms are present in an amount of about 0.1% to about 10% or about 0.1% to about 5% based on the total integrated peak intensity determined by $^{27}Al$ NMR of aluminum species present in the zeolite. In some embodiments, the molecular sieve has a pore size of about 3 to about 8 Angstroms. In some embodiments, the molecular sieve has a pore size of about 3 to about 5 Angstroms. In some embodiments, the zeolitic framework comprises a d6r unit. In some embodiments, the zeolitic framework is selected from AEI, AFT, AFV, AFX, AVL, CHA, DDR, EAB, EEI, ERI, IFY, IRN, KFI, LEV, LTA, LTN, MER, MWF, NPT, PAU, RHO, RTE, RTH, SAS, SAT, SAV, SFW, TSC, UFI, and combinations thereof. In some embodiments, the zeolitic framework is selected from AEI, CHA, AFX, ERI, KFI, LEV, a CHA-AEI intergrowth, and combinations thereof. In some embodiments, the zeolitic framework is CHA. In some embodiments, the CHA structure is an aluminosilicate zeolite. In some embodiments, the aluminosilicate zeolite has a silica to alumina ratio (SAR) of about 5 to about 100.

In some embodiments, the metal is present in the catalyst composition in an amount of from about 0.01% to about 15.0% by weight, based on the total weight of the metal-containing molecular sieve, calculated as metal oxide. In some embodiments, the metal is copper, iron, or a combination thereof. In some embodiments, copper is present in the molecular sieve in an amount of from about 0.01% to about 6.0% by weight of final metal-containing zeolite, calculated as copper oxide (CuO). In some embodiments, the molecular sieve further comprises a promoter metal selected from the group consisting of alkali metals, alkaline earth metals, transition metals in Groups IIIB, IVB, VB, VIB VIIB, VIIIB, IB, and IIB, Group IIIA elements, Group IVA elements, lanthanides, actinides, and a combination thereof.

Another aspect of the invention is directed to a catalyst article comprising a catalyst substrate having a plurality of channels adapted for gas flow, each channel having a wall surface in adherence to a catalytic coating comprising the catalyst composition of the invention. In some embodiments, the catalyst substrate is a honeycomb comprising a wall flow filter substrate or a flow through substrate. In some embodiments, the catalytic coating is present on the substrate with a loading of at least about 1.0 g/in$^3$.

Another aspect of the invention is directed to a method for reducing NO$_x$ level in an exhaust gas comprising contacting the gas with a catalyst for a time and temperature sufficient to reduce the level of NO$_x$ in the gas, wherein the catalyst is a catalyst composition of the invention. In some embodiments, the NO$_x$ level in the exhaust gas is reduced to N$_2$ at a temperature between about 200° C. to about 600° C. In some embodiments, the NO$_x$ level in the exhaust gas is reduced by at least about 60% at 200° C. In some embodiments, the NO$_x$ level in the exhaust gas is reduced by at least about 50% at 600° C.

Another aspect of the invention is directed to an emission treatment system for treatment of an exhaust gas stream, the emission treatment system comprising:

i.) an engine producing an exhaust gas stream;

ii.) a catalyst article according to the invention positioned downstream from the engine in fluid communication with the exhaust gas stream and adapted for the reduction of NO$_x$ within the exhaust stream to form a treated exhaust gas stream; and iii.) an injector adapted for the addition of a reductant to the exhaust gas stream to promote reduction of NO$_x$ to N$_2$ and water as the exhaust gas stream is exposed to the catalyst article.

In some embodiments, the emission treatment system further comprises a diesel oxidation catalyst. In some embodiments, the reductant comprises ammonia or an ammonia precursor.

The present disclosure includes, without limitation, the following embodiments.

Embodiment 1

An SCR catalyst composition comprising a metal-containing molecular sieve comprising a zeolitic framework of silicon and aluminum atoms; and extra-framework aluminum atoms that are present in an amount of about less than 15% based on the total integrated peak intensity determined by $^{27}Al$ NMR of aluminum species present in the zeolite as measured prior to addition of the metal.

Embodiment 2

The catalyst composition of the preceding embodiment, wherein the extra framework aluminum atoms are present in an amount of about 0.1% to about 10% based on the total integrated peak intensity determined by $^{27}Al$ NMR of aluminum species present in the zeolite.

Embodiment 3

The catalyst composition of any preceding embodiment, wherein the extra framework aluminum atoms are present in an amount of about 0.1% to about 5% based on the total integrated peak intensity determined by $^{27}Al$ NMR of aluminum species present in the zeolite.

Embodiment 4

The catalyst composition of any preceding embodiment, wherein the molecular sieve has a pore size of about 3 to about 8 Angstroms.

Embodiment 5

The catalyst composition of any preceding embodiment, wherein the molecular sieve has a pore size of about 3 to about 5 Angstroms.

Embodiment 6

The catalyst composition of any preceding embodiment, wherein the zeolitic framework comprises a d6r unit.

Embodiment 7

The catalyst composition of any preceding embodiment, wherein the zeolitic framework is selected from AEI, AFT, AFV, AFX, AVL, CHA, DDR, EAB, EEI, ERI, IFY, IRN, KFI, LEV, LTA, LTN, MER, MWF, NPT, PAU, RHO, RTE, RTH, SAS, SAT, SAV, SFW, TSC, UFI, and combinations thereof.

Embodiment 8

The catalyst composition of any preceding embodiment, wherein the zeolitic framework is selected from AEI, CHA, AFX, ERI, KFI, LEV, a CHA-AEI intergrowth, and combinations thereof.

Embodiment 9

The catalyst composition of any preceding embodiment, wherein the zeolitic framework is CHA.

Embodiment 10

The catalyst composition of any preceding embodiment, wherein the CHA structure is an aluminosilicate zeolite.

Embodiment 11

The catalyst composition of any preceding embodiment, wherein the aluminosilicate zeolite has a silica-to alumina ratio (SAR) of about 5 to about 100.

Embodiment 12

The catalyst composition of any preceding embodiment, wherein the metal is present in the catalyst composition in an amount of from about 0.01% to about 15.0% by weight, based on the total weight of the metal-containing molecular sieve, calculated as metal oxide.

Embodiment 13

The catalyst composition of any preceding embodiment, wherein the metal is copper, iron, or a combination thereof.

Embodiment 14

The catalyst composition of any preceding embodiment, wherein copper present in the molecular sieve in an amount of from about 0.01% to about 10.0% by weight of final metal-containing zeolite, calculated as copper oxide (CuO).

Embodiment 15

The catalyst composition of any preceding embodiment, wherein the molecular sieve further comprises a promoter metal selected from the group consisting of alkali metals, alkaline earth metals, transition metals in Groups IIIB, IVB, VB, VIB VIIB, VIIIB, IB, and IIB, Group IIIA elements, Group IVA elements, lanthanides, actinides, and a combination thereof.

Embodiment 16

A catalyst article comprising a catalyst substrate having a plurality of channels adapted for gas flow, each channel having a wall surface in adherence to a catalytic coating comprising the catalyst composition according to any preceding embodiment.

Embodiment 17

The catalyst article of any preceding embodiment, wherein the catalyst substrate is a honeycomb comprising a wall flow filter substrate or a flow through substrate.

Embodiment 18

The catalyst article of any preceding embodiment, wherein the catalytic coating is present on the substrate with a loading of at least about 1.0 $g/in^3$.

Embodiment 19

A method for reducing $NO_x$ level in an exhaust gas comprising contacting the gas with a catalyst for a time and temperature sufficient to reduce the level of $NO_x$ in the gas, wherein the catalyst is a catalyst composition according to any preceding embodiment.

Embodiment 20

The method of any preceding embodiment, wherein the $NO_x$ level in the exhaust gas is reduced to $N_2$ and water at a temperature between 200° C. to about 600° C.

Embodiment 21

The method of any preceding embodiment, wherein the $NO_x$ level in the exhaust gas is reduced by at least 60% at 200° C.

Embodiment 22

The method of any preceding embodiment, wherein the $NO_x$ level in the exhaust gas is reduced by at least 50% at 600° C.

Embodiment 23

An emission treatment system for treatment of an exhaust gas stream, the emission treatment system comprising:
i.) an engine producing an exhaust gas stream;
ii.) a catalyst article according to any preceding embodiment positioned downstream from the engine in fluid communication with the exhaust gas stream and adapted for the reduction of $NO_x$ within the exhaust stream to form a treated exhaust gas stream; and
iii.) an injector adapted for the addition of a reductant to the exhaust gas stream to promote reduction of $NO_x$ to $N_2$ and water as the exhaust gas stream is exposed to the catalyst article.

Embodiment 24

The emission treatment system of any preceding embodiment, further comprising a diesel oxidation catalyst.

Embodiment 25

The emission treatment system of any preceding embodiment, wherein the reductant comprises ammonia or an ammonia precursor.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION

Figure 1:
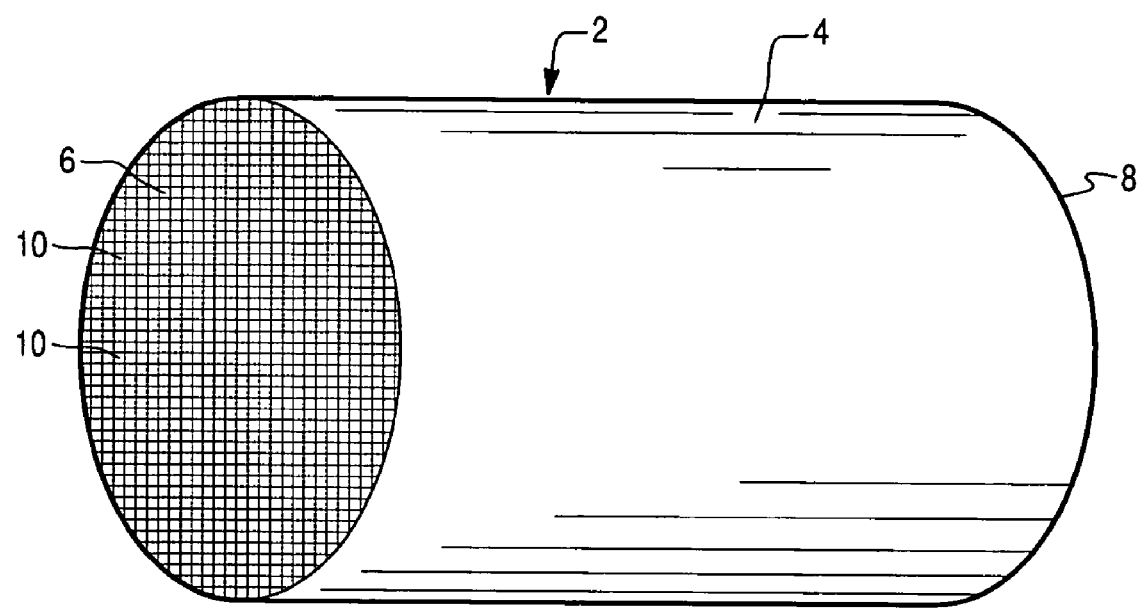
FIG. 1 is a perspective view of a honeycomb-type substrate carrier which may comprise a selective reduction catalyst (SCR) washcoat composition in accordance with the present invention.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise.

The present disclosure generally provides catalysts, catalyst articles and catalyst systems comprising such catalyst articles. In particular, such articles and systems comprise an SCR catalyst composition, which includes a copper-containing chabazite (CHA) zeolite material with a desired low amount of extra-framework aluminum atoms present. The term "copper-containing zeolite" typically comprises zeolites ion-exchanged or impregnated with copper, which subsequently have been calcined. Extra framework aluminum atoms are generally produced when the zeolite material is exposed to high temperatures during the preparation of the zeolite material (i.e., calcination) and/or during usage in an engine emission treatment system, wherein a portion of the aluminum atoms are removed from the framework. When intact, the zeolitic framework provides exchangeable sites within the pores and cages of the framework, wherein catalytic metal species (i.e., copper) are able to reside. However, when a fraction of aluminum atoms are extra-framework aluminum atoms, the framework has less exchangeable sites available for the catalytic metal species able to reside in. As a result, the loading of the catalytic metal declines and a decrease in catalytic activity of the zeolite material is generally observed. The aluminum atoms previously removed from the intact framework (often referred to as extra-framework aluminum atoms) may remain in the zeolite material.

The present disclosure relates to methods of making zeolite materials, such as metal-containing chabazite (CHA) zeolite materials, with a reduced amount of extra-framework aluminum atoms. In particular, these methods include but are not limited to modifying calcination procedures to require lower temperatures (i.e., below about 700° C.), chemical pretreatments (e.g., peroxides), and/or changes in calcination atmosphere. The disclosed modified calcination procedures render zeolite materials with higher copper loadings, improved hydrothermal stability (particularly when exposed to hydrothermal aging conditions), improved Cu-ion exchange properties, and better $NO_x$ conversion activity.

The following terms shall have, for the purposes of this application, the respective meanings set forth below.

As used herein, the term "selective catalytic reduction" (SCR) refers to the catalytic process of reducing oxides of nitrogen to dinitrogen ($N_2$) using a nitrogenous reductant (e.g., ammonia, urea, and the like).

As used herein, the term "catalyst" or "catalyst composition" refers to a material that promotes a reaction.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

As used herein, the term "stream" broadly refers to any combination of flowing gas that may contain solid or liquid particulate matter. The term "gaseous stream" or "exhaust gas stream" means a stream of gaseous constituents, such as the exhaust of a lean burn engine, which may contain entrained non-gaseous components such as liquid droplets, solid particulates, and the like. The exhaust gas stream of a lean burn engine typically further comprises combustion products, products of incomplete combustion, oxides of nitrogen, combustible and/or carbonaceous particulate matter (soot), and un-reacted oxygen and nitrogen.

As used herein, the term "substrate" refers to the monolithic material onto which the catalyst composition is placed, typically in the form of a washcoat containing a plurality of particles containing a catalytic composition thereon. A washcoat is formed by preparing slurry containing a certain solid content (e.g., 10-80% by weight) of particles in a liquid vehicle, which is then coated onto a substrate and dried to provide a washcoat layer.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated.

As used herein, the term "catalyst article" refers to an element that is used to promote a desired reaction. For example, a catalyst article may comprise a washcoat containing catalytic compositions on a substrate.

The term "abate" means to decrease in amount and "abatement" means a decrease in the amount, caused by any means.

Catalyst Composition

The catalyst composition includes a metal-containing molecular sieve having at least one metal. The concentration of metal present in the metal-containing molecular sieve can vary, but will typically be from about 0.1 wt. % to about 15 wt. % relative to the weight of the metal-containing molecular sieve, calculated as metal oxide. Likewise, the concentration of any optionally additional metal present in the metal-containing molecular sieve can also vary, but will typically be from about 0.1 wt. % to about 15 wt. % relative to the weight of the metal-containing molecular sieve, calculated as the metal oxide. In some embodiments, copper is selected as the metal and is present in the copper-containing molecular sieve at a concentration from about 0.1 wt. % to about 10 wt. % relative to the weight of the metal-containing molecular sieve, calculated as copper oxide. In some embodiments, the molecular sieve is a chabazite (CHA) zeolite support.

The metal is intentionally added to the molecular sieves to enhance the catalytic activity compared to molecular sieves that do not have a metal intentionally added. These metals are often referred to as "promoter metals" and are added to the molecular sieve using ion-exchange processes or incipient wetness processes. Therefore, these metal-containing molecular sieves are often referred to as 'metal-promoted" molecular sieves. In order to promote the selective catalytic reduction (SCR) of oxides of nitrogen, in one or more embodiments, a suitable metal is exchanged into the molecular sieve component.

Accordingly, the molecular sieve of one or more embodiments may be subsequently ion-exchanged or impregnated with one or more metals selected from the group consisting of alkali metals, alkaline earth metals, transition metals in Groups IIIB, IVB, VB, VIB VIIB, VIIIB, IB, and IIB, Group IIIA elements, Group IVA elements, lanthanides, actinides and a combination thereof. In further embodiments, the molecular sieve of one or more embodiments may be subsequently ion-exchanged or impregnated with one or more promoter metals such as copper (Cu), cobalt (Co), nickel (Ni), lanthanum (La), manganese (Mn), iron (Fe), vanadium (V), silver (Ag), and cerium (Ce), neodymium (Nd), praseodymium (Pr), titanium (Ti), chromium (Cr), zinc (Zn), tin (Sn), niobium (Nb), molybdenum (Mo), hafnium (Hf), yttrium (Y), and tungsten (W). In specific embodiments, the molecular sieve component is promoted with Cu.

As mentioned previously, the promoter metal content of the metal-containing molecular sieve component, calculated as the oxide, is, in one or more embodiments, at least about 0.1 wt. %, reported on a volatile-free basis. In one or more embodiments, the promoter metal is present in an amount in the range of about 0.1% to about 10% by weight, based on the total weight of the metal-containing molecular sieve. In one or more specific embodiments, the promoter metal comprises Cu, and the Cu content, calculated as CuO ranges from about 0.5% to about 10% wt., from about 1.0% to about 8.0% wt., from about 2.5% to about 5% wt., or from about 3.75% wt. to about 4.5% wt. (e.g., less than about 9% wt., about 8% wt., about 7% wt., about 6% wt., about 5% wt., about 4% wt., about 3% wt., about 2% wt., about 1% wt., about 0.5% wt., and about 0.1% wt., on an oxide basis with a lower boundary of 0% wt.) based on the total weight of the calcined metal-containing molecular sieve component and reported on a volatile free basis.

In addition to copper, any optional metal can be selected from the group consisting of alkali metals, alkaline earth metals, transition metals in Groups IIIB, IVB, VB, VIB VIIB, VIIIB, IB, and IIB, Group IIIA elements, Group IVA elements, lanthanides, actinides and a combination thereof.

As mentioned previously, any optional additional metal content of the metal-containing molecular sieve component, calculated as the oxide, is, in one or more embodiments, at least about 0.1 wt. %, reported on a volatile-free basis. In one or more embodiments, the optional additional metal is present in an amount in the range of about 1 to about 10% by weight, based on the total weight of the metal-containing molecular sieve.

The molecular sieves of the current invention refer to support materials such as zeolites and other framework materials (e.g. isomorphously substituted materials), which may be in particulate form, and in combination with one or more promoter metals, used as catalysts. Molecular sieves are materials based on a three-dimensional network of tetrahedrally coordinated atoms (e.g., B, Si, P, Al) connected with bridging oxygen atoms, containing generally tetrahedral type sites and having a substantially uniform pore distribution, with a maximum pore size being no larger than 20 Å. The pore sizes are defined by the ring size. Zeolites refer to molecular sieves, which include silicon and aluminum atoms and include materials such as aluminosilicates. Aluminosilicate zeolite limits the material to molecular sieves that do not include phosphorus or other metals substituted in the framework, e.g., as used herein the term "aluminosilicate zeolite" excludes aluminophosphate materials such as SAPO, ALPO, and MeAPO materials, which include aluminum and phosphate atoms within the zeolite framework.

Aluminosilicate zeolites generally comprise open 3-dimensional framework structures composed of corner-sharing $TO_4$ tetrahedra, where T is Al or Si. In one or more embodiments, the small-pore molecular sieve comprises $SiO_4/AlO_4$ tetrahedra and is linked by common oxygen atoms to form a three-dimensional network. The small-pore molecular sieve of one or more embodiments is differentiated mainly according to the geometry of the pores which are formed by the network of the $SiO_4/AlO_4$ tetrahedra. The entrances to the pores are formed from 8, 9, 10, 12, or more tetrahedral ring atoms with respect to the atoms which form the entrance opening. In one or more embodiments, the molecular sieve comprises ring sizes of no larger than 8, including 4, 6, and 8.

According to one or more embodiments, the molecular sieve can be based on the framework topology by which the structures are identified. Typically, any structure type of zeolite can be used, such as structure types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof. In certain embodiments, the structure type is selected from AEI, AFT, AFV, AFX, AVL, CHA, DDR, EAB, EEI, ERI, IFY, IRN, KFI, LEV, LTA, LTN, MER, MWF, NPT, PAU, RHO, RTE, RTH, SAS, SAT, SAV, SFW, TSC, UFI, and combinations thereof. Existing intergrowth structures of these materials, e.g., including, but not limited to CHA-AEI are also intended to be encompassed herein. See, for example, Collection of Simulated XRD Powder Patterns for Zeolites, M. M. J. Treacy, J. B. Higgins, Elsevier, Fifth Edition, 2007; and Atlas of Zeolite Framework Types, Ch. Baerlocher et al, Elsevier, Sixth Edition, 2007, which are herein incorporated by reference. In some embodiments, the zeolitic framework is CHA. In some embodiments, the CHA structure is an aluminosilicate zeolite. In some embodiments, the aluminosilicate zeolite has a silica to alumina ratio (SAR) of about 5 to about 100.

In one or more embodiments, the molecular sieve comprises an 8-ring small pore aluminosilicate zeolite. As used herein, "small pore" refers to pore openings which are smaller than about 5 Angstroms, for example on the order of ~3.8 Angstroms. The phrase "8-ring" zeolite refers to zeolites having 8-ring pore openings. Some 8-ring zeolites have double-six ring secondary building units in which a cage like structure is formed resulting from the connection of double six-ring building units by 4 rings. Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. For example, a group of zeolites have a single 4-ring (s4r) building unit in their framework structure. In the 4-ring, the "4" denotes the positions of tetrahedral silicon and aluminum atoms, and the oxygen atoms are located in between tetrahedral atoms. Other composite building units include, for example, a double 4-ring (d4r) unit and a double 6-ring (d6r) unit. The d4r unit is created by joining two s4r units. The d6r unit is created by joining two s6r units. In a d6r unit, there are twelve tetrahedral atoms. Zeolitic structure types that have a d6r secondary building unit include AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, and WEN.

In one or more embodiments, the molecular sieve is a small-pore, 8-ring molecular sieve having a pore structure and a maximum ring size of eight tetrahedral atoms. In some embodiments, the small-pore molecular sieve comprises a d6r unit. In some embodiments, the small-pore molecular sieve has a structure type selected from AEI, AVF, AFT, AFX, AVL, CHA, DDR, EAB, EEI, EMT, ERI, FAU, GME, IFY, IRN, JSR, KFI, LEV, LTA, LTL, LTN, MER, MOZ, MSO, MWW, OFF, PAU, RHO, RTE, SAS, SAT, SAV, SBS, SBT, SFW, SSF, SZR, TSC, UFI, WEN, and combinations thereof. In other specific embodiments, the molecular sieve has a structure type selected from the group consisting of CHA, AEI, AFX, ERI, KFI, LEV, and combinations thereof. In still further specific embodiments, the small-pore molecular sieve has a structure type selected from CHA, AEI, and AFX. In one or more very specific embodiments, the small-pore molecular sieve component has the CHA structure type.

In one or more embodiments, the molecular sieves include chabazite (CHA) crystal structure zeolites and are selected from an aluminosilicate zeolite, a borosilicate, a gallosilicate, a SAPO, and ALPO, a MeAPSO, and a MeAPO. In some embodiments, the CHA crystal structure is an aluminosilicate zeolite. Natural as well as synthetic zeolites may also be used, but synthetic zeolites are preferred because these zeolites have more uniform silica-alumina ratio (SAR), crystallite size, and crystallite morphology, and have fewer and less concentrated impurities (e.g. alkali and alkaline earth metals). For example, in some embodiments, zeolitic chabazite includes a naturally occurring tectosilicate mineral of a zeolite group with approximate formula: $(Ca,Na_2,K_2,Mg)Al_2Si_4O_{12} \cdot 6H_2O$ (e.g., hydrated calcium aluminum silicate). Three synthetic forms of zeolitic chabazite are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., 1956, 2822, Barrer et al; Zeolite D, described in British Patent No. 868,846 (1961); and Zeolite R, described in U.S. Pat. No. 3,030,181, which are hereby incorporated by reference in their entireties. Synthesis of another synthetic form of zeolitic chabazite, SSZ-13, is described in U.S. Pat. No. 4,544,538, which is hereby incorporated by reference in its entirety.

Specific zeolites having the CHA structure that are useful in the present invention include, but are not limited to SSZ-13, SSZ-62, natural chabazite, zeolite K-G, Linde D, Linde R, LZ-218, LZ-235, LZ-236, ZK-14, and ZYT-6.

The particle size of the zeolite can vary. Generally the particle size of CHA zeolite can be characterized by a D90 particle size of about 10 to about 100 microns, preferably about 10 to about 30 microns, more preferably 10 microns to about 20 microns. D90 is defined as the particle size at which 90% of the particles have a finer particle size.

Molecular sieves (e.g., CHA zeolite) typically exhibit a BET surface area in excess of 60 $m^2/g$, often up to about 200 $m^2/g$ or higher. "BET surface area" has its usual meaning of referring to the Brunauer, Emmett, Teller method for determining surface area by $N_2$ adsorption. In one or more embodiments, the surface area surface area is at least about 200 $m^2/g$, or at least about 400 $m^2/g$, or at least about 600 $m^2/g$.

Molecular sieves (e.g., CHA zeolite) typically exhibit a zeolitic surface area (ZSA) ranging from about 100 $m^2/g$ to about 595 $m^2/g$. In a typical method, a zeolite powder as referenced above is placed in a narrow neck tube with a cylindrical bulb on the bottom. The sample is then degassed at 200-500° C. for up to about 6 hours, e.g., at about 350° C. for about 2 hours, under a flow of dry nitrogen or in vacuum. After cooling, the sample tube is weighed and then placed on the instrument for BET measurement. Typically, the adsorption gas is nitrogen but other gases (e.g., including, but not limited to, argon and carbon dioxide and mixtures thereof) can also be used. When the measurement is complete, the instrument software calculates the BET Surface Area, Matrix Surface Area (MSA) and the t-plot micropore (Zeolitic) Surface Area (ZSA).

The powder is placed in a sample tube, weighed, and introduced into a nitrogen physisorption analyzer. The sample is analyzed using at least 3 nitrogen partial pressure points between 0.08 and 0.21 $P/P_0$. BET surface area can be obtained from the resulting isotherm. The BET surface area is a combination of ZSA and matrix surface area (MSA) (pores>2 nm) (BET=ZSA+MSA). Accordingly, ZSA (and MSA) values can be obtained by calculation using software associated with the instrument. Using the partial pressure points and the volume of nitrogen adsorbed at each partial pressure, these values are then used in the Harkins and Jura equation and plotted as Volume Adsorbed vs. Thickness: Harkins and Jura Equation 1 (Harkins and Jura Equation):

$$\text{Thickness} = (13.99/0.034 - \log_{10}(P/P_0))^{1/2}$$

A least-squares analysis fit is performed on the nitrogen adsorbed volume vs. thickness plot. From this, the slope and the Y-intercept are calculated. Matrix (external) surface area (MSA) and then zeolitic surface area (ZSA) are calculated based on Equations 2 and 3.

$$MSA = (\text{Slope} \times 0.0015468/1.0) \qquad \text{Equation 2:}$$

$$ZSA = BET - MSA \qquad \text{Equation 3:}$$

It should be pointed out that those skilled in the art of evaluating BET will be aware that the BET/ZSA can also be evaluated using nitrogen (or other adsorbing gas) partial pressure points outside of the 0.08 to 0.21 P/P$_0$ range. While BET/ZSA results may vary from those obtained using P/P$_0$ in the 0.08-0.21 range, they can be used to evaluate and compare samples.

The ZSA can be expressed in m$^2$/g or in m$^2$/in$^3$ where objects (e.g., coated catalytic cores) of equal size by weight or volume are compared. ZSA refers to surface area associated primarily with the micropores of a zeolite (typically about 2 nm or less in diameter).

Zeolites are crystalline materials having rather uniform pore sizes which, depending upon the type of zeolite and the type and amount of cations included in the zeolite lattice, range from about 3 to 10 Angstroms, about 3 to 8 Angstroms, or about 3 to about 5 Angstroms in diameter.

The ratio of silica to alumina of an aluminosilicate molecular sieve can vary over a wide range. In one or more embodiments, the molecular sieve has silica to alumina molar ratio (SAR) in the range of 2 to 300, including 5 to 250; 5 to 200; 5 to 100; and 5 to 50. In one or more specific embodiments, the molecular sieve has a silica to alumina molar ratio (SAR) in the range of 10 to 200, 10 to 100, 10 to 75, 10 to 60, and 10 to 50; 15 to 100, 15 to 75, 15 to 60, and 15 to 50; 20 to 100, 20 to 75, 20 to 60, and 20 to 50.

In one or more specific embodiments, the small-pore molecular sieve has the CHA structure type and has a silica-to-alumina ratio of from 2 to 300, including 5 to 250, 5 to 200, 5 to 100, and 5 to 50; 10 to 200, 10 to 100, 10 to 75, 10 to 60, and 10 to 50; 15 to 100, 15 to 75, 15 to 60, and 15 to 50; 20 to 100, 20 to 75, 20 to 60, and 20 to 50. In a specific embodiment, the small-pore molecular sieve comprises SSZ-13. In a very specific embodiment, the SSZ-13 has a silica-to-alumina ratio of from 2 to 300, including 5 to 250, 5 to 200, 5 to 100, and 5 to 50; 10 to 200, 10 to 100, 10 to 75, 10 to 60, and 10 to 50; 15 to 100, 15 to 75, 15 to 60, and 15 to 50; 20 to 100, 20 to 75, 20 to 60, and 20 to 50.

In some embodiments, the presence of framework aluminum and extra-framework aluminum in a zeolite prior to ion-exchange or impregnation with a metal (e.g., Cu) can be measured using Aluminum Nuclear Magnetic Resonance ($^{27}$Al-NMR) spectroscopy as a function of the signal intensities corresponding to Al atoms in framework positions and Al atoms in non-framework positions. See, for example, Fyfe, C. et al., J. Am. Chem. Soc. 2001, 123, 5285-5291, which is incorporated herein by reference in its entirety. In some embodiments, the ratio of framework aluminum species to extra-framework aluminum species ranges from about 500:1. 250:1, 100:1, 50:1, 25:1, or 10:1. In some embodiments, the amount of extra-framework aluminum ranges from about 0.1% to about 15%, 0.1% to about 5%, or 0.1% to about 1% based on the total integrated peak intensity of aluminum species present in the zeolite (i.e., less than about 15%, about 14%, about 13%, about 12%, about 11%, about 10%, about 9%, about 8%, about 7%, about 6%, about 5%, about 4%, about 3%, about 2%, about 1%, or less than about 0.5%, with a lower boundary of 0%) determined $^{27}$Al-NMR.

Other analytical techniques can be used to characterize the degree of dealumination of the zeolitic frameworks or the presence of octahedrally coordinated aluminum species in the zeolite. X-ray powder diffraction (XRD) methods allow evaluation of the unit cell size/volume which is sensitive to the removal of aluminum atoms from the framework. It is well established that for a given bulk silicon to aluminum ratio of the zeolite, the presence of the extra-framework aluminum due to dealumination can be correlated with the decrease in unit cell size/volume. Other spectroscopic techniques e.g. X-ray Adsorption Spectroscopy (XAS) or X-ray photoelectron spectroscopy (XPS) can be also used for direct detection of octahedral aluminum in zeolites.

Aluminosilicates generally comprise open 3-dimensional framework structures anionic in nature. Cations balance the charge of the anionic framework and are loosely associated with the negatively charged framework atoms, while the remaining pore volume is filled with water molecules. The non-framework cations are generally exchangeable, and the water molecules removable. For example, aluminum atoms present as part of the anionic framework carry negative charge which is compensated for by cations such as catalytic metal cations. Typically, the catalytic metal content or the degree of exchange of a zeolite is determined by the quantity of catalytic metal species present in the zeolite, typically residing in exchangeable sites.

Various methods of processing a zeolite can adversely affect zeolite structures. For example, when the zeolite is exposed to high temperatures the integrity of the zeolitic framework is often compromised resulting in an overall decrease in catalytic activity of the SCR catalyst composition. Without intending to be bound by theory, it is thought that exposure to high temperatures can lead to aluminum atoms being removed from the framework leading to portions of the zeolitic framework to collapse. The zeolitic framework provides exchangeable sites within the pores and cages of the framework, wherein catalytic metal species (i.e., copper) are able to reside. Removal of aluminum atoms from the initial framework and the resulting partial collapse of the framework is a process often referred to as "dealumination". The aluminum atoms removed from the framework can stay outside of the framework and are thus often referred to as "extra-framework aluminum atoms". Dealumination of zeolitic framework can occur in the presence and/or absence of a catalytic metal ion residing in the exchangeable sites of the zeolitic framework. In both instances less exchangeable sites are available for a catalytic metal ion to insert into during ion-exchange and/or continue to reside in to maintain catalytic activity. As such, a decrease in NO$_x$ abatement can be observed in catalysts containing dealuminated zeolite. For ion-exchange of catalytic metals into a partially collapsed framework the amount of catalytic metal able to insert can vary thereby affecting the catalytic activity of the ion-exchanged zeolite material. As such, dealumination of zeolitic frameworks should be minimized.

Substrate

According to one or more embodiments, the substrate for the SCR catalyst composition may be constructed of any material typically used for preparing automotive catalysts and will typically comprise a metal or ceramic honeycomb structure. The substrate typically provides a plurality of wall surfaces upon which the SCR catalyst washcoat composition is applied and adhered, thereby acting as a carrier for the catalyst composition.

Exemplary metallic substrates include heat resistant metals and metal alloys, such as titanium and stainless steel as well as other alloys in which iron is a substantial or major component. Such alloys may contain one or more of nickel, chromium, and/or aluminum, and the total amount of these metals may advantageously comprise at least 15 wt. % of the alloy, e.g., 10-25 wt. % of chromium, 3-8 wt. % of aluminum, and up to 20 wt. % of nickel. The alloys may also contain small or trace amounts of one or more other metals, such as manganese, copper, vanadium, titanium and the like. The surface or the metal carriers may be oxidized at high temperatures, e.g., 1000° C. and higher, to form an oxide layer on the surface of the substrate, improving the corrosion resistance of the alloy and facilitating adhesion of the washcoat layer to the metal surface.

Ceramic materials used to construct the substrate may include any suitable refractory material, e.g., cordierite, mullite, cordierite-α alumina, silicon carbide, silicon nitride, aluminum titanate, zircon mullite, spodumene, alumina-silica magnesia, zircon silicate, sillimanite, magnesium silicates, zircon, petalite, α alumina, aluminosilicates and the like.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which can be of any suitable cross-sectional shape, such as trapezoidal, rectangular, square, sinusoidal, hexagonal, oval, circular, and the like. Such structures may contain from about 60 to about 1200 or more gas inlet openings (i.e., "cells") per square inch of cross section (cpsi), more usually from about 300 to 600 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil, or 600 cpsi and a wall thickness of 4 mil. However, it will be understood that the invention is not limited to a particular substrate type, material, or geometry.

Figure 2:
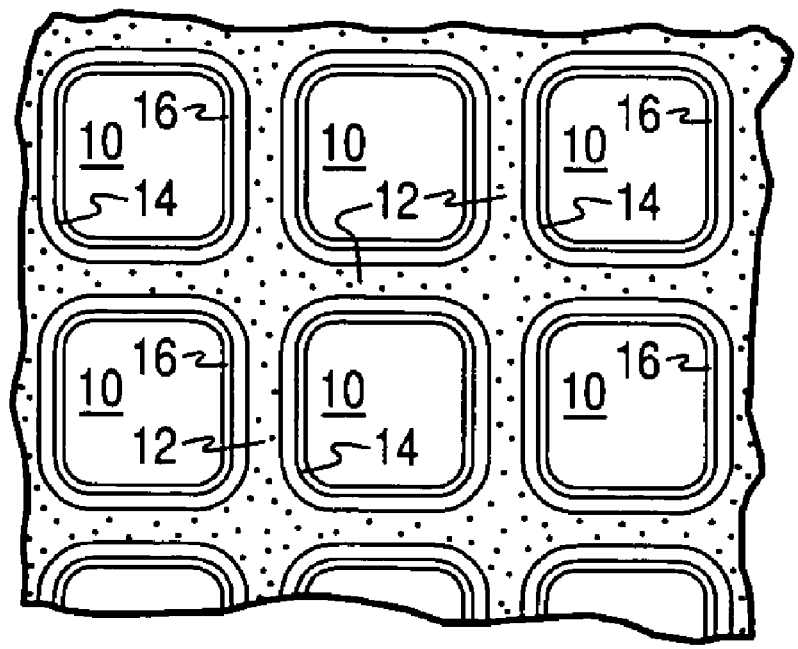
FIG. 2 is a partial cross-sectional view enlarged relative to FIG. 1 and taken along a plane parallel to the end faces of the substrate carrier of FIG. 1 representing a monolithic flow-through substrate, which shows an enlarged view of a plurality of the gas flow passages shown in FIG. 1.

In alternative embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used a wall-flow filter substrates. However, it will be understood that the invention is not limited to a particular substrate type, material, or geometry. Note that where the substrate is a wall-flow substrate, the SCR catalyst composition can permeate into the pore structure of the porous walls (i.e., partially or fully occluding the pore openings) in addition to being disposed on the surface of the walls. FIGS. 1 and 2 illustrate an exemplary substrate 2 in the form of a flow-through substrate coated with a washcoat composition as described herein. Referring to FIG. 1, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 2, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 2, walls 12 are so dimensioned and configured that gas flow passages 10 have a substantially regular polygonal shape. As shown, the washcoat composition can be applied in multiple, distinct layers if desired. In the illustrated embodiment, the washcoat consists of both a discrete bottom washcoat layer 14 adhered to the walls 12 of the carrier member and a second discrete top washcoat layer 16 coated over the bottom washcoat layer 14. The present invention can be practiced with one or more (e.g., 2, 3, or 4) washcoat layers and is not limited to the illustrated two-layer embodiment.

Figure 3:
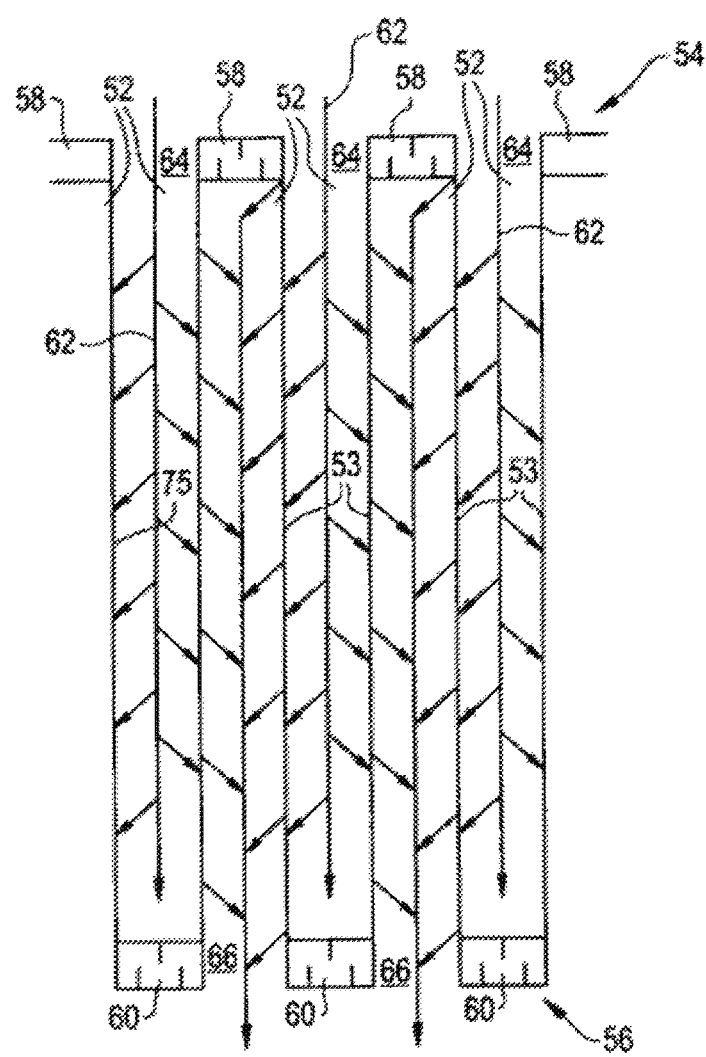
FIG. 3 is a cutaway view of a section enlarged relative to FIG. 1, wherein the honeycomb-type substrate carrier in FIG. 1 represents a wall flow filter substrate monolith.

Alternatively, FIGS. 1 and 3 illustrate an exemplary substrate 2 in the form a wall flow filter substrate coated with a washcoat composition as described herein. As seen in FIG. 3, the exemplary substrate 2 has a plurality of passages 52. The passages are tubularly enclosed by the internal walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. The porous wall flow filter used in this invention is catalyzed in that the wall of said element has thereon or contained therein one or more catalytic materials. Catalytic materials may be present on the inlet side of the element wall alone, the outlet side alone, both the inlet and outlet sides, or the wall itself may be filled with all, or part, of the catalytic material. This invention includes the use of one or more layers of catalytic material that are within the wall or on the inlet and/or outlet walls of the element.

In describing the quantity of washcoat or catalytic metal components or other components of the composition, it is convenient to use units of weight of component per unit volume of catalyst substrate. Therefore, the units, grams per cubic inch ("g/in$^3$") and grams per cubic foot ("g/ft$^3$") are used herein to mean the weight of a component per volume of the substrate, including the volume of void spaces of the substrate. Other units of weight per volume such as g/L are also sometimes used. The total loading of the SCR catalyst composition (i.e., metals and zeolite support material) on the catalyst substrate, such as a monolithic flow-through substrate, is typically from about 0.1 to about 6 g/in$^3$, and more typically from about 1 to about 5 g/in$^3$. It is noted that these weights per unit volume are typically calculated by weighing the catalyst substrate before and after treatment with the catalyst washcoat composition, and since the treatment process involves drying and calcining the catalyst substrate at high temperature, these weights represent an essentially solvent-free catalyst coating as essentially all of the water of the washcoat slurry has been removed.

Method of Making the Catalyst Composition

Preparation of molecular sieves (e.g., zeolite) and related micro- and mesoporous materials varies according to the structure type of the molecular sieve, but typically involves the combination of several components (e.g. silica, alumina, phosphorous, alkali, organic template etc.) to form a synthesis gel, which is then hydrothermally crystallized to form a final product. In the preparation of zeolitic material, the structure directing agent (SDA) can be in the form of an organic, i.e., tetraethylammonium hydroxide (TEAOH), or inorganic cation, i.e. $Na^+$ or $K^+$ During crystallization, the tetrahedral units organize around the SDA to form the desired framework, and the SDA is often embedded within the pore structure of the zeolite crystals. In one or more embodiments, the crystallization of the molecular sieve materials can be obtained by means of the addition of structure-directing agents/templates, crystal nuclei or elements. In some instances, the crystallization can be performed at temperatures of less than 100° C. A molecular sieve having the CHA structure may be prepared according to various techniques known in the art, for example U.S. Pat. No. 8,293,198 to Beutel et al.; U.S. Pat. No. 8,715,618 of Trukhan et al.; U.S. Pat. No. 9,162,218 of Bull et al.; U.S. Pat. No. 8,883,119 of Bull et al., U.S. Pat. No. 4,544,538 to Zones et al; and U.S. Pat. No. 6,709,644 to Zones et al., which are herein incorporated by reference in their entireties.

Optionally, the obtained alkali metal zeolite is $NH_4$-exchanged to form $NH_4$—Chabazite. The $NH_4$-ion exchange can be carried out according to various techniques known in the art, for example Bleken, F. et al., Topics in Catalysis 52, (2009), 218-228, which is herein incorporated by reference in its entirety.

In some embodiments, the molecular sieves (e.g., alkali metal zeolite or the $NH_4$-exchanged zeolite (e.g., $NH_4$—Chabazite)) are calcined prior to ion-exchange or impregnation with a metal ion. The temperature during calcination of the alkali metal zeolite or the $NH_4$-exchanged zeolite is less than about 750° C. In some embodiments, the calcining temperature ranges from about 300° C. to about 700° C., about 300° C. to about 600° C., about 300° C. to about 500° C., about 400° C. to about 500° C., or from about 450° C. to about 500° C. for a period of time. In some embodiments, the calcining temperature is less than about 700° C., about 600° C., about 500° C., about 450° C., or about 400° C., with a lower boundary of 300° C. In some embodiments, the period of time for calcination ranges from about 1 hour to about 16 hours, about 1 to about 10 hours, or from 1 hours to about 6 hours (i.e., less than about 16 hours, about 15 hours, about 14 hours, about 13 hours, about 12 hours, about 11 hours, about 10 hours, about 9 hours, about 8 hours, about 7 hours, about 6 hours, about 5 hours, about 4 hours, about 3 hours, about 2 hours, or about 1 hour with a lower boundary of about 10 minutes). See, for example, Lang, L. et al. Microporous and Mesoporous Materials, 235, 2016, 143-150, which is incorporated herein in its entirety.

In some embodiments, the molecular sieves are pretreated with peroxide prior to calcining. For example, hydrogen peroxide may be added to molecular sieves (e.g., zeolite) alone or in combination with an organic solvent.

In some embodiments, the molecular sieves are calcined in an atmosphere comprising ozone. See, for example, U.S. Pat. Appl. No. 2016/0038929 to Kolb, and Burton, A., Catalysis Society of Metropolitan New York, 2017, 22 and Guo, P., Inorganic Chemistry, 2016, 1444-1448, which are incorporated herein by reference in their entireties.

In some embodiments, the metal-containing molecular sieves are prepared using ion-exchange or impregnation methods to deliver the metal to the molecular sieve, which is subsequently calcined. For example, the preparation of a metal ion-exchanged molecular sieve typically involves an ion-exchanged process of the above mentioned molecular sieve in particulate form with a metal precursor solution. For example, to prepare metal-promoted molecular sieves according to various embodiments of the invention, a metal (e.g., copper) is ion exchanged into the molecular sieves. See ion-exchange techniques described in U.S. Pat. No. 9,138,732 to Bull et al.; and U.S. Pat. No. 8,715,618 to Trukhan et al., which are incorporated by reference therein in their entireties. In some embodiments, a copper salt can be used as a metal precursor to provide copper for the ion-exchange process. In some embodiments, copper acetate is used as a copper salt. In some embodiments, the metal precursor (e.g., copper salt) concentration used to prepare the metal ion-exchanged molecular sieves may range from about 0.1 wt. % to about 10 wt. % relative to the weight of the metal ion-exchanged molecular sieves.

For additional promotion of the SCR catalytic activity, in some embodiments, the molecular sieves can be promoted with two or more metals (e.g., copper in combination with one or more other metals). Where two or more metals are to be included in a metal-promoted molecular sieve material, multiple metal precursors (e.g., copper and iron precursors) can be ion-exchanged at the same time or separately. In certain embodiments, the second metal can be exchanged into a molecular sieve material that has first been promoted with the first metal (e.g., a second metal can be exchanged into a copper-promoted molecular sieve material). The second molecular sieve material can vary and, in some embodiments, may be iron or an alkaline earth or alkali metal. Suitable alkaline earth or alkali metals include, but are not limited to, barium, magnesium, beryllium, calcium, strontium, radium, and combinations thereof.

The preparation of a metal-impregnated molecular sieve typically comprises impregnating the molecular sieve with an active metal solution, such as a copper and/or iron precursor solution, respectively. The active metal (e.g., copper and/or iron) can be impregnated into same molecular sieve using an incipient wetness technique. Incipient wetness impregnation techniques, also called capillary impregnation or dry impregnation are commonly used for the synthesis of heterogeneous materials, i.e., catalysts. Typically, an active metal precursor is dissolved in an aqueous or organic solution and then the active metal-containing solution is added to a catalyst support containing the same pore volume as the volume of the solution that was added. Capillary action draws the solution into the pores of the support. Solution added in excess of the support pore volume causes the solution transport to change from a capillary action process to a diffusion process, which is much slower.

During the ion-exchange or impregnation process, the molecular sieves are usually sufficiently dry to absorb substantially all of the solution to form a moist solid. Following treatment of the molecular sieves with the solution of the (active) metal precursors, the metal-containing molecular sieves are dried, such as by heat treating the metal-containing molecular sieves at elevated temperature (e.g., 100-150° C.) for a period of time (e.g., 1-3 hours), and then calcining to remove the volatile components within the solution, depositing the metal on the surface of the molecular sieves and converting the metal to a more catalytically active oxide form. The concentration profile of the impregnated material depends on the mass transfer conditions within the pores during impregnation and drying.

The temperature during calcination of the metal-containing molecular sieves is less than about 750° C. In some embodiments, the calcining temperature ranges from about 300° C. to about 700° C., about 300° C. to about 500° C., about 350° C. to about 500° C., about 400° C. to about 500° C., or from about 425° C. to about 475° C. for a period of time. In some embodiments, the calcining temperature is less than about 700° C., about 600° C., about 500° C., about 450° C., about 400° C., or about 350° C., with a lower boundary of 300° C. In some embodiments, the period of time for calcination ranges from about 1 hour to about 16 hours, about 1 to about 10 hours, or from 3 hours to about 6 hours (i.e., less than about 16 hours, about 15 hours, about 14 hours, about 13 hours, about 12 hours, about 11 hours, about 10 hours, about 9 hours, about 8 hours, about 7 hours, about 6 hours, about 5 hours, about 4 hours, about 3 hours, about 2 hours, or about 1 hour with a lower boundary of about 10 minutes).

In order to reach the desired level of (active) metal precursor being ion-exchanged or impregnated, the above process can be repeated more than once. The resulting material can be stored as a dry powder or in slurry form.

Substrate Coating Process

The above-noted SCR catalyst composition, in the form of carrier particles (e.g., molecular sieves) containing one or more metal components ion-exchanged or impregnated therein, is mixed with water to form a slurry for purposes of coating a catalyst substrate, such as a honeycomb-type substrate.

In addition to the catalyst particles, the slurry may optionally contain binders such as alumina, silica and/or titania, zirconium acetate, water-soluble or water-dispersible stabilizers (e.g., barium acetate), promoters (e.g., lanthanum nitrate), associative thickeners, and/or surfactants (including anionic, cationic, non-ionic or amphoteric surfactants).

When present, the binder is typically used in an amount of about 0.05 g/in$^3$ to about 1 g/in$^3$. When alumina is used as the binder it can be, for example, boehmite, pseudo-boehmite, gamma-alumina, delta/theta alumina, silica-alumina, zirconia-alumina, or combinations thereof.

The slurry can be milled to enhance mixing of the particles and formation of a homogenous material. The milling can be accomplished in a ball mill, continuous mill, or other similar equipment, and the solids content of the slurry may be, e.g., about 10-80 wt. %, more particularly about 30-40 wt. %. In one embodiment, the post-milling slurry is characterized by a D90 particle size of about 5 to about 40 microns, preferably 5 to about 30 microns, more preferably about 5 to about 10 microns. The D90 is defined as the particle size at which 90% of the particles have a finer particle size.

The slurry is then coated on the catalyst substrate using a washcoat technique known in the art. In one embodiment, the catalyst substrate is dipped one or more times in the slurry or otherwise coated with the slurry. Thereafter, the coated substrate is dried at an elevated temperature (e.g., 100-150° C.) for a period of time (e.g., about 10 minutes to about 3 hours) and then calcined by heating, e.g., less than 700° C., typically for about 10 minutes to about 8 hours.

The temperature during calcination of coated catalyst substrate is less than about 700° C. In some embodiments, the calcining temperature ranges from about 300° C. to about 700° C., about 300° C. to about 500° C., about 350° C. to about 500° C., about 400° C. to about 500° C., or from about 450° C. to about 500° C. for a period of time. In some embodiments, the calcining temperature is less than about 700° C., about 600° C., about 500° C., about 450° C., about 400° C., or about 350° C. with a lower boundary of 300° C. In some embodiments, the period of time for calcination ranges from about 10 minutes to about 8 hours, about 1 to about 6 hours, or from 3 hours to about 6 hours (i.e., less than 8 hours, 7 hours, 6 hours, 5 hours, 4 hours, 3 hours, 2 hours, or 1 hour with a lower boundary of about 10 minutes).

Following drying and calcining, the final washcoat coating layer can be viewed as essentially solvent-free. After calcining, the catalyst loading can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat layer may be applied. For example, in some embodiments, the catalyst composition can be applied as a single layer or in multiple layers. In one embodiment, the catalyst is applied in a single layer (e.g., only layer 14 of FIG. 2). In another embodiment, the catalyst composition is applied in multiple layers (e.g., layers 14 and 16 of FIG. 2).

In some embodiments, the calcined coated substrate is aged. Aging can be conducted under various conditions and, as used herein, "aging" is understood to encompass a range of conditions (e.g., temperature, time, and atmosphere). Exemplary aging protocols involve subjecting the calcined coated substrate to a temperature of 650° C. for about 50 hours in 10% steam, 750° C. for about 5 hours in 10% steam, or to a temperature of 800° C. for about 16 hours in 10% steam. However, these protocols are not intended to be limiting and the temperature can be lower or higher (e.g., including but not limited to, temperatures of 400° C. and higher, e.g., 400° C. to 900° C., 600° C. to 900° C., or 650° C. to 900° C.); the time may be lesser or greater (e.g., including but not limited to, times of about 1 hour to about 50 hours or about 2 hours to about 25 hours); and the atmosphere can be modified (e.g., to have different amounts of steam and/or other constituents present therein).

Of particular importance herein, the resulting coated substrate is evaluated (after calcination and aging) to determine the surface area of the coated substrate (e.g., test core). The activity of the catalyst article (e.g., coated substrate) can be affected by the zeolitic surface area (ZSA) of the washcoat, particularly after calcination and aging. "ZSA" as used herein is the "zeolitic surface area," and can be expressed in m$^2$/g, m$^2$/in$^3$, or simply in m$^2$ (in case of "tZSA") where objects of equal size by weight or volume are compared. ZSA refers to surface area associated primarily with the micropores of a zeolite (typically about 2 nm or less in diameter). Although "ZSA" refers by name specifically to "zeolite" surface area, this term is intended to be more broadly applicable to molecular sieve surface areas generally. Methods of evaluating ZSA are disclosed in more detail below.

"tZSA" as used herein is the "total zeolitic surface area," and is expressed in m$^2$. tZSA also refers to surface area associated primarily with the micropores of a zeolite. tZSA can be calculated by multiplying the ZSA given in m$^2$/g by the total weight of the tested core to yield tZSA in, e.g., units of m$^2$. tZSA, although referring by name specifically to total "zeolite" surface area, is intended to be more broadly applicable to total molecular sieve surface areas generally.

"Volumetric ZSA" expressed in $m^2/in^3$ of the tested core can be also used when comparing certain catalytic articles, such as coated substrates, e.g., honeycombs, wall-flow filters, and the like. Volumetric ZSA can be obtained by dividing the tZSA by the volume of the tested core to yield volumetric ZSA in, e.g., units of $m^2/in^3$.

Traditionally, BET/ZSA measurements are made by preparing a catalyst composition, coating the composition onto a substrate core (a portion of a substrate as disclosed herein above), calcining and aging the coated core, and scraping off and/or crushing the coating (washcoat) to obtain measurements on the coating (washcoat). This method is time consuming and tedious and leads to results that may not be accurate due to the difficulty of obtaining a sample that is a true representation of the active, tested washcoat. In the current disclosure, the BET/ZSA of full, intact cores (i.e., without removing the coating (washcoat) from the core, and/or without crushing the core prior to BET/ZSA testing) is determined by evaluating the cores of varying sizes in whole/uncrushed form (e.g., in the actual physical form as tested for SCR performance) so that at least one cell of the core is structurally intact. Specifically, a coated core is placed in a sample tube, weighed, and introduced into a nitrogen physisorption analyzer. The sample is analyzed using at least 3 nitrogen partial pressure points between 0.08 and 0.21 $P/P_0$. BET surface area can be obtained from the resulting isotherm. The BET surface area is a combination of ZSA and matrix surface area (MSA) (pores>2 nm) (BET=ZSA+MSA). Accordingly, ZSA (and MSA) values can be obtained by calculation using software associated with the instrument. Using the partial pressure points and the volume of nitrogen adsorbed at each partial pressure, these values are then used in the Harkins and Jura equation and plotted as Volume Adsorbed vs. Thickness:

Harkins and Jura Equation 1 (Harkins and Jura Equation):

$$\text{Thickness} = (13.9910.034 - \log_{10}(P/P_0))^{1/2}$$

A least-squares analysis fit is performed on the nitrogen adsorbed volume vs. thickness plot. From this, the slope and the Y-intercept are calculated. Matrix (external) surface area (MSA) and then zeolitic surface area (ZSA) are calculated based on Equations 2 and 3.

$$MSA = (\text{Slope} \times 0.0015468/1.0) \quad \text{Equation 2:}$$

$$ZSA = BET - MSA \quad \text{Equation 3:}$$

It should be pointed out that those skilled in the art of evaluating BET will be aware that the BET/ZSA can also be evaluated using nitrogen (or other adsorbing gas) partial pressure points outside of the 0.08 to 0.21 $P/P_0$ range. While BET/ZSA results may vary from those obtained using $P/P_0$ in the 0.08-0.21 range, they can be used to evaluate and compare samples.

Catalyst articles comprising an SCR composition of the invention exhibit a ZSA of about 100 $m^2/g$ or greater. In some embodiments, the catalyst article of the invention has a ZSA of about 120 $m^2/g$ or about 125 $m^2/g$ or greater or about 130 $m^2/g$ or greater. Exemplary ranges for certain embodiments include, but are not limited to, about 120 $m^2/g$ to about 250 $m^2/g$ or about 120 $m^2/g$ to about 200 $m^2/g$.

In certain embodiments, aged tested cores are defined in terms of their "total ZSA," or "tZSA." To obtain tZSA values, the previously described core ZSA (typically reported in $m^2/g$) is multiplied by the total weight of the tested core to yield tZSA in $m^2$. Typical size of the tested core considered for the purpose of these embodiments is approximately 1.3 $in^3$ (as provided in Example 5); however, use of "tZSA" accounts for cores of varying sizes (e.g., weights). Exemplary tZSA values are about 1000 $m^2$ or greater, about 1200 $m^2$ or greater, about 1300 $m^2$ or greater, about 1500 $m^2$ or greater, about 2000 $m^2$ or greater, about 2100 $m^2$ or greater, or about 2200 $m^2$ or greater, e.g., in some embodiments including, but not limited to, about 1000 to about 3000 $m^2$, about 1200 to about 3000 $m^2$, about 1500 to about 3000 $m^2$, or about 2000 to about 3000 $m^2$.

In yet other embodiments, aged tested cores are described in terms of "Volumetric ZSA." To obtain volumetric ZSA values, the previously described t ZSA (reported in $m^2$) is divided by the total volume of the tested core to yield volumetric ZSA in $m^2/in^3$. Typical size of the tested core considered for the purpose of these embodiments is approximately 1.3 $in^3$ (as provided in Example 5); however, use of "volumetric ZSA" accounts for cores of varying sizes (e.g., volumes). According to the present disclosure, volumetric ZSA values are advantageously maximized (particularly to provide low temperature SCR performance). Exemplary volumetric ZSA values are about 900 $m^2/in^3$ or greater, about 1000 $m^2/in^3$ or greater, about 1100 $m^2/in^3$ or greater, about 1200 $m^2/in^3$ or greater, about 1500 $m^2/in^3$ or greater, or about 1600 $m^2/in^3$ or greater, e.g., in some embodiments including, but not limited to, about 900 to about 2300 $m^2/in^3$, about 1000 to about 2300 $m^2/in^3$, about 1100 to about 2300 $m^2/in^3$, about 1200 to about 2300 $m^2/in^3$, or about 1500 to about 2300 $m^2/in^3$.

Emission Treatment System

The present invention also provides an emission treatment system that incorporates the SCR catalyst composition described herein. The SCR catalyst composition of the present invention is typically used in an integrated emissions treatment system comprising one or more additional components for the treatment of exhaust gas emissions, e.g., exhaust gas emissions from a diesel engine. For example, the emission treatment system may further comprise a catalyzed soot filter (CSF) component and/or a selective diesel oxidation (DOC) catalyst article. The SCR catalyst composition of the invention is typically located upstream or downstream from the soot filter and downstream from the diesel oxidation catalyst component, although the relative placement of the various components of the emission treatment system can be varied. The emission treatment system further includes components, such as reductant injectors for ammonia precursors, and may optionally include any additional particulate filtration components, AMOx component, $NO_x$ storage and/or trapping components. The preceding list of components is merely illustrative and should not be taken as limiting the scope of the invention.

The CSF may comprise a substrate coated with a washcoat layer containing one or more catalysts for burning trapped soot and or oxidizing exhaust gas stream emissions. In general, the soot burning catalyst can be any known catalyst for combustion of soot. For example, the CSF can be catalyzed with one or more high surface area refractory oxides (e.g., an alumina or a zirconia oxide) and/or an oxidation catalyst (e.g., a ceria-zirconia) for the combustion of unburned hydrocarbons and to some degree particulate matter. The soot burning catalyst can be an oxidation catalyst comprising one or more precious metal catalysts (e.g., platinum, palladium, and/or rhodium). In some embodiments, the CSF may comprise a substrate coated with a washcoat layer containing one or more catalysts for reducing $NO_x$ in the exhaust gas stream emissions. For example, CSF can be catalyzed with one or more selective reduction catalysts for the conversion of $NO_x$ in the exhaust gas stream in addition to containing one or more layers containing one or more catalysts for burning trapped soot and or oxidizing exhaust gas stream emissions.

Figure 4:
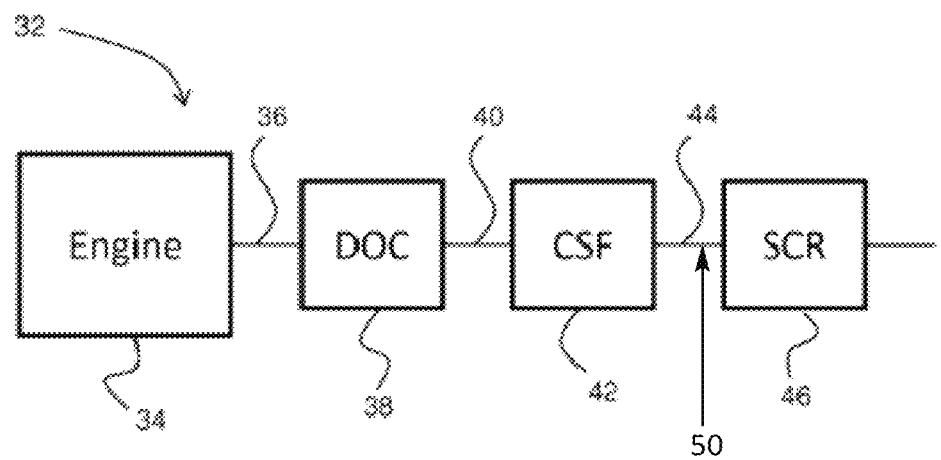
FIG. 4 shows a schematic depiction of an embodiment of an emission treatment system in which an SCR catalyst composition of the present invention is utilized.

One exemplary emissions treatment system is illustrated in FIG. 4, which depicts a schematic representation of an emission treatment system 32. As shown, an exhaust gas stream containing gaseous pollutants and particulate matter is conveyed via exhaust pipe 36 from an engine 34 to a diesel oxidation catalyst (DOC) 38 to a catalyzed soot filter (CSF) to a selective catalytic reduction (SCR) component 46, which is coated with the washcoat composition of the present invention. In the DOC 38, unburned gaseous and non-volatile hydrocarbons (i.e., the SOF) and carbon monoxide are largely combusted to form carbon dioxide and water. In addition, a proportion of the NO of the $NO_x$ component may be oxidized to $NO_2$ in the DOC.

The exhaust stream is next conveyed via exhaust pipe 40 to a catalyzed soot filter (CSF) 42, which traps particulate matter present within the exhaust gas stream. The CSF 42 is optionally catalyzed for passive or active soot regeneration. The CSF 42 can optionally include a SCR catalyst composition for the conversion of $NO_x$ present in the exhaust gas.

After removal of particulate matter, via CSF 42, the exhaust gas stream is conveyed via exhaust pipe 44 to a downstream SCR component 46 of the invention for the further treatment and/or conversion of $NO_x$. The exhaust gas passes through the SCR component 46 at a flow rate which allows sufficient time for the catalyst composition to reduce the level of NO in the exhaust gas at a given temperature. The SCR component 46 may optionally be included in the emission treatment system when CSF 42 already includes an SCR composition. An injector 50 for introducing a nitrogenous reducing agent into the exhaust stream is located upstream of the SCR catalyst component 46. In some embodiments, the injector 50 may also be introduced upstream of the CSF 42 provided that the CSF 42 includes an SCR composition. The introduced nitrogenous reducing agent into the gas exhaust stream promotes the reduction of the NO to $N_2$ and water as the gas is exposed to the catalyst composition.

With respect to this SCR process, provided herein is a method for the reduction of NO in an exhaust gas, which comprises contacting the exhaust gas with the catalyst composition described herein and optionally in the presence of a reductant for a time and temperature sufficient to catalytically reduce $NO_x$ thereby lowering the concentration of NO in the exhaust gas. In certain embodiments, the temperature range is from about 200° C. to about 600° C. For example, at a temperature of 200° C. the SCR catalyst composition of the invention reduces the level of NO in the exhaust gas by at least about 60%. Likewise, at a temperature of 600° C. the SCR catalyst composition of the invention reduces the level of NO in the exhaust gas by at least about 50%. The amount of NO reduction is dependent upon the contact time of the exhaust gas stream with the SCR catalyst composition, and thus is dependent upon the space velocity. The contact time and space velocity is not particularly limited in the present invention. However, the present SCR catalyst composition of the invention has shown increased NO reduction compared to commercial reference SCR catalysts. As such, the SCR catalyst composition can perform, well even at high space velocity, which is desirable in certain applications.

A nitrogenous reducing agent may be introduced into the exhaust gas prior to contacting the SCR catalyst for the treatment of $NO_x$. In general, this reducing agent for SCR processes broadly means any compound that promotes the reduction of NO in an exhaust gas. Examples of such reductants include ammonia, hydrazine or any suitable ammonia precursor such as urea $((NH_2)_2CO)$, ammonium carbonate, ammonium carbamate, ammonium hydrogen carbonate or ammonium formate. In one embodiment, the nitrogenous reducing agent is added using a reductant injector, which adds ammonia precursor to the gas exhaust stream upstream of the SCR component 46. The presence of ammonia or the ammonia precursor in the gas exhaust stream promotes the reduction of the $NO_x$ to $N_2$ and water as the gas is exposed to the SCR catalyst composition.

EXAMPLES

Aspects of the present invention are more fully illustrated by the following examples, which are set forth to illustrate certain aspects of the present invention and are not to be construed as limiting thereof.

Example 1: General Preparation of Chabazite Molecular Sieve with Varying Extra-Framework Aluminum Content A molecular sieve powder with the chabazite framework structure (CHA) was prepared by crystallization of chabazite using ADAOH (trimethyl-1-adamantylammonium hydroxide) containing synthesis gel followed by separation of the chabazite product and subsequent drying and calcination to remove the organic template (ADAOH). Water, ADAOH solution, and aqueous sodium hydroxide were added into the make-down tank and mixed for several minutes. Aluminum isopropoxide powder was then added in 3-5 minutes. Colloidal silica was then added with stirring in 5 minutes. Mixing was continued for an additional 30 minutes, resulting in a viscous gel of uniform composition. The gel with final silica to alumina (SAR) ratio of about 32 and pH~13 was then transferred to the autoclave. The autoclave was heated to 170° C., and crystallization was continued for 10-30 h while maintaining agitation. The reactor was cooled to ambient temperature and vented to atmospheric pressure prior to unloading. After hydrothermal crystallization, the resultant suspension had a pH of 11.5. The suspension was admixed with deionized water and was filtered using a Buchner funnel. The wet product was then heated to a temperature of 120° C. in air for 4 h for drying. See, also, U.S. Pat. No. 8,883,119 for additional preparation methods of chabazite molecular sieves, which is incorporated herein by reference.

The dried product was calcined in a rotary or muffle furnace in flowing air under varying conditions. Generally, the test samples were calcined at a temperature ranging from about 490 to about 780° C. for a time period ranging from about 1 to about 6 h. Samples were cooled to ambient temperature and analyzed by $^{27}Al$ magic angle spinning nuclear magnetic resonance (MAS NMR) spectroscopy techniques to determine the amount of octahedral aluminum (also referred to as extra-framework aluminum) according to the procedure described below.

Example 2: $^{27}Al$ MAS NMR Studies of Chabazite Samples with Varying Extra-Framework Aluminum Content Chabazite samples (in the calcined form) were hydrated in a desiccator containing a saturated solution of $NH_4NO_3$ for 48 h prior to the measurements.

All $^{27}Al$ NMR experiments were performed on an Agilent DD2 600 MHz (14.1) spectrometer. $^{27}Al$ NMR spectra were measured using a 3.2 mm spinning assembly at spinning rates of 15-20 kHz. One dimensional $^{27}$Al NMR spectra were obtained using non-selective pi/12 pulses. Typically, 4-16k scans were acquired with a relaxation delay of 1-5 s. 1.0 M Al(NO$_3$)$_3$ solution was used to calibrate the radio frequency (rf) field and was used as a reference. $^{27}$Al NMR spectra were processed using ACD/Labs® to output intensities and fitted using Origin Pro®. Percentage of extra-framework aluminum is defined as the integrated peak intensities in the frequency range of 20 to −30 ppm in the NMR spectrum.

$^{27}$Al NMR results of chabazite test sample 1-5 (as made, calcined form) are shown in Table 1 below. The amount of octahedral aluminum (i.e., extra-framework aluminum) present in each chabazite sample is provided as a function of the percentages of integrated peak intensities. The temperature and time given for the sample(s) calcined in the rotary furnace should be considered best estimates. Values provided for the muffle furnace calcinations are considered more accurate. It should be also noted that the calcination processes and the resulting material may be affected by additional process variables e.g. sample size, bed depth, air (gas) flow and gas flow distribution, and furnace type. Test sample 5 calcined at the lowest temperature shows the lowest amount of the octahedral aluminum.

TABLE 1

| Test Sample | Octahedral aluminum, % | Calcination Conditions temperature/time/furnace |
|---|---|---|
| 1 | 19 ± 1 | ~780° C./1 h/rotary |
| 2 | 11 ± 1 | ≈700° C./1 h/rotary |
| 3 | 8 ± 1 | 650° C./6 h/muffle |
| 4 | 6 ± 1 | 500° C./6 h/muffle |
| 5 | 2 ± 1 | 490° C./6 h/muffle |

Figure 5:
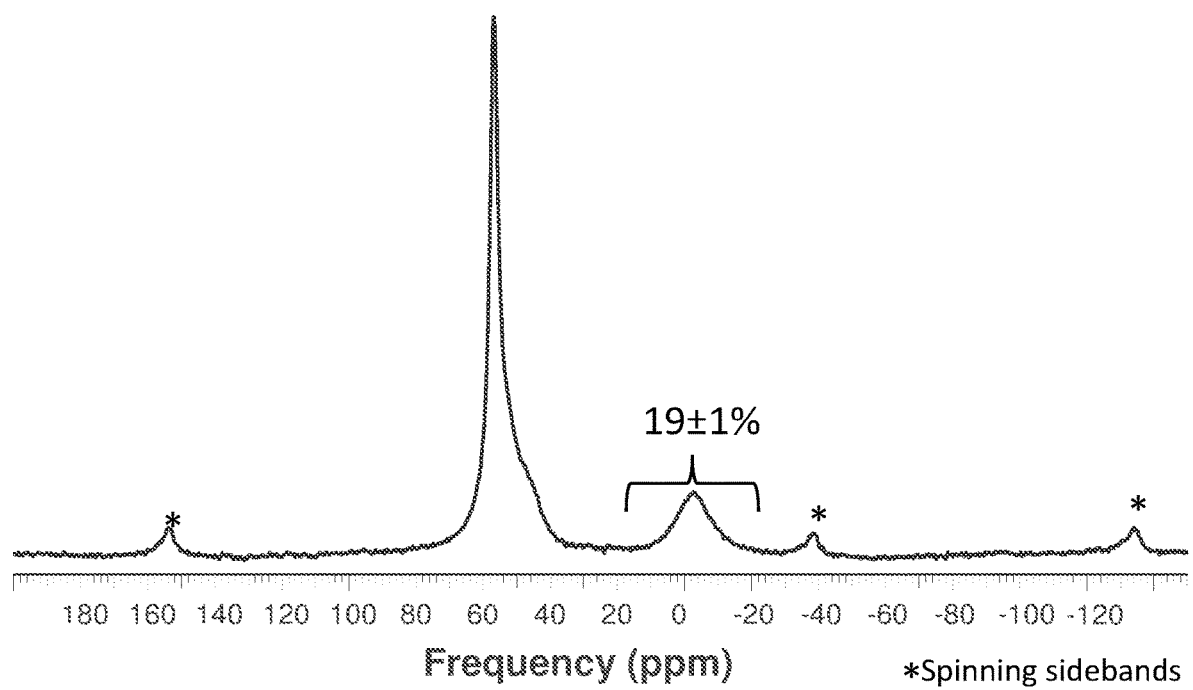
FIG. 5 shows an $^{27}Al$ NMR spectrum of a sample transition metal ion-free chabazite containing about 19% extra-framework aluminum.

An $^{27}$Al NMR spectrum of chabazite test sample 1 is shown in FIG. 5. $^{27}$Al NMR signal in the frequency range of 20 to −30 in the spectrum shows the presence of octahedral aluminum and the signal at about 56 ppm shows the presence of tetrahedral aluminum (i.e. aluminum in the framework).

Example 3: SCR Testing of Powder Samples of Copper-Containing Molecular Sieves with Varying Extra-Framework Aluminum Content Cu-containing catalyst samples with varying amounts of extra-framework aluminum were prepared by first exchanging the sodium ions in the chabazite zeolite samples prepared in Example 1 with ammonium ions followed by calcination and impregnation with a copper solution.

The sodium ions in the chabazite zeolite samples were exchanged by stirring the zeolite in a 27% ammonium nitrate solution with a 1:8 solids to liquid ratio at 80° C. The stirring rate was adjusted to ensure that the entire zeolite sample was in constant motion. After stirring for 1 h at 80° C., the mixture was allowed to cool to room temperature before filtering. The collected filtercake was washed continuously with double distilled (DI) water until the conductivity measurements of the filtrate was less than 50 μΩ. The filtercake was dried at 90° C. overnight and dried samples were calcined at 450° C.

Copper was introduced using a Cu nitrate solution. The impregnated samples were sealed and held at 50° C. for 20 h, followed by calcination at 450° C. for 5 h. The calcined powders were then shaped with a Zr acetate binder, calcined at 550° C. for 1 h, crushed and sieved to obtain 250-500 μm fractions. The Cu containing catalyst samples comprised a CuO loading of about 3.25% by weight. Prior to testing, sized powder samples were aged under two different conditions (see Table 2).

Samples were tested for SCR catalytic activity in a high-throughput reactor under the following conditions: GHSV=80,000 h$^{-1}$, 500 ppm NO, 500 ppm NH$_3$, 5% H$_2$O, 10% O$_2$, balance N$_2$.

Table 2 summarizes the testing results, showing varying NO$_x$ conversion activity of powder samples 1-3, as the amount of extra-framework aluminum varies. For example, powder sample 3 exhibits optimal NO$_x$ conversion in this series of samples having an extra-framework aluminum of 6%. Powder samples with increasing amounts of extra-framework aluminum (such as powder samples 1 and 2) exhibit a decrease in NO$_x$ conversion. Samples aged at 650° C. for 50 h in the presence of 10% steam generally exhibit a more significant decrease in NO$_x$ conversion activity as the amount extra-framework aluminum % increases compared to samples aged at 800° C. for 16 h in the presence of 10% steam.

TABLE 2

| Powder Samples | Aging: extra-framework aluminum (%) | 650° C./50 h/ 10% H$_2$O NO$_x$ conversion at 200° C. (%) | 800° C./16 h/ 10% H$_2$O NO$_x$ conversion at 200° C. (%) |
|---|---|---|---|
| 1 | 19 | 64 | 61 |
| 2 | 11 | 73 | 68 |
| 3 | 6 | 80 | 72 |

Example 4: Preparation of Copper-Containing Molecular Sieves with Varying Extra-Framework Aluminum Content For the synthesis yielding about 25 g of dried zeolite, 4.68 g (3.74%) DI water was added to a Teflon autoclave liner that contained a stirrer. While stirring, 44.19 g (35.4%) of Cyclohexyltrimethylammonium hydroxide (20% w/v) was added, followed by the subsequent addition of 12.45 g (9.96%) of Tetramethylammonium hydroxide (25% w/v) and 5.56 g (4.45%) Aluminum Isopropoxide (100% w/w). The mixture continued stirring while being covered for 1 h. 57.21 g (45.8%) Ludox AS-40 (40% w/v) was added to the mixture dropwise and after completion of addition continued for 30 minutes. 0.91 g (0.73%) calcined SSZ-13 seeds were added to the mixture and left to stir for 10 minutes. The obtained pH for the mixture after 10 minutes was typically between 13-14. The stirrer was removed and the Teflon liner with the mixture was loaded to a stirred 300 mL autoclave and heated to 170° C. over an 8 h ramp for 24 h. The stirring rate was set to 500 rpm. After hydrothermal crystallization, the resultant suspension was admixed with DI water and filtered to obtain CHA as a wet product, which was dried.

The dried product was split into several smaller test samples, which were calcined in a rotary muffle furnace in flowing air under varying conditions to obtain samples having different aluminum content as shown in Table 3. Generally, the test samples were calcined at a temperature ranging from about 490 to about 780° C. for a period ranging from about 1 to about 6 h. Samples were cooled to room temperature prior to ion-exchange with copper.

The dried CHA zeolite test samples were then individually ion exchanged with copper according to the following procedure. A 10 g sample of CHA zeolite test sample was placed on a moisture balance to obtain a moisture value/loss on drying (LOD) value. A 250 mL glass beaker with stir bar was placed on a hot plate with thermocouple probe. The liquids to solids ratio was 5:1 and to achieve this value, the amount of Cu-acetate needed to achieve a desired molar concentration of Cu-Acetate (typically 0.1-0.3 M) was calculated, the moisture in the CHA powder was subtracted from 50 g deionized water, and the resultant amount of deionized water was added to the beaker. The beaker was covered with a watch glass and the mixture was heated to 60° C. Upon reaching this temperature, the amount of zeolite (based on the moisture content) was added to the beaker. The Cu-acetate was then immediately added. The beaker was again covered with the watch glass and the mixture was held for one hour at 60° C. After this time, the heat was removed and the resulting slurry was cooled for about 20-30 minutes. The slurry was then removed from the beaker and passed through a Buchner funnel and the filtered solids were washed with additional deionized water. The filtered, washed solids (Cu-CHA) were dried at 85° C. overnight.

Example 5: Preparation of Coated Cu-CHA-Containing Catalyst Samples

Water (162.0 g) was added to dry Cu-CHA zeolite powder (108.2 g), giving a 40% solids slurry. Zirconium acetate (17.8 g of a 30.3 wt. % zirconium acetate solution in water, equivalent to 5.41 g of zirconium acetate, calculated as about 5 wt. % based on the zeolite content) was added. The mixture was shear mixed at 2500 rpm for 30 minutes and 1-2 drops of octanol was added to defoam the resulting slurry. The slurry solids content was determined to be 39.90% by weight, the pH of the slurry was 4.05, the D90 particle size of the slurry was 6.7 μm, and the viscosity of the slurry was 60 cps. Two square cores (13 cells×13 cells×3.00 in) with 400/6 cell density were coated with the slurry to give about a 2.1 g/in$^3$ loading (+/−0.1 g/in$^3$, i.e., within the range of 2.0-2.20 g/in$^3$) by dip coating, drying at 130° C. for 4 minutes, coating again if necessary, and calcining after the target loading was reached. The copper content of the samples ranged from about 3.8 to about 3.9 wt. %. Subsequent aging conditions of catalyst articles prior to core testing are shown in Table 3.

Example 6: SCR Testing of Core Cu-Containing Catalyst Samples with Varying Extra-Framework Aluminum Content Fresh and/or aged cores were tested for SCR performance in a tube reactor using a standard protocol, e.g., as disclosed in PCT Application Publication No. WO2008/106519 to Bull et al., which is incorporated herein by reference, under the following conditions: GHSV=80,000 h$^{-1}$, 500 ppm NO, 500 ppm NH$_3$, 5% H$_2$O, 10% O$_2$, balance N$_2$. The results for the measured testing core samples are presented in Table 3.

Sample 3 exhibits the lowest amount of extra-framework aluminum and has the highest NO$_x$ conversion at 200° C. and 600° C. independent of the aging conditions. As the amount of extra-framework aluminum increases amongst the test samples there is a general trend of a decrease in NO$_x$ conversion activity at 200° C. and 600° C. regardless of what aging conditions were applied to the samples. Generally, the test samples exposed to the aging conditions at 650° C. exhibit better NO conversion at 200° C. and 600° C. compared to the test samples exposed to aging conditions at 800° C.

That which is claimed:

1. An SCR catalyst composition comprising:
   a metal-containing molecular sieve comprising a zeolitic framework of silicon and aluminum atoms; and
   extra-framework aluminum atoms that are present in an amount of about less than 15% based on the total integrated peak intensity determined by $^{27}$Al NMR of aluminum species present in the zeolite as measured prior to addition of the metal;
   wherein the zeolitic surface area of the catalyst composition ranges from 120 m$^2$/g to 250 m$^2$/g;
   wherein the zeolitic framework is selected from AEI, AFT, AFV, AFX, AVL, CHA, DDR, EAB, EEI, ERI, IFY, IRN, KFI, LEV, LTA, LTN, MER, MWF, NPT, PAV, RHO, RTE, RTH, SAS, SAT, SAV, SFW, TSC, UFI, and combinations thereof; and
   wherein the molecular sieve has a silica to alumina molar ratio ranging from 20 to 100.

2. The catalyst composition of claim 1, wherein the extra framework aluminum atoms are present in an amount of about 0.1% to about 10% based on the total integrated peak intensity determined by $^{27}$Al NMR of aluminum species present in the zeolite.

3. The catalyst composition of claim 2, wherein the molecular sieve has a pore size of about 3 to about 5 Angstroms.

4. The catalyst composition of claim 1, wherein the extra framework aluminum atoms are present in an amount of about 0.1% to about 5% based on the total integrated peak intensity determined by $^{27}$Al NMR of aluminum species present in the zeolite.

5. The catalyst composition of claim 1, wherein the molecular sieve has a pore size of about 3 to about 8 Angstroms.

6. The catalyst composition of claim 1, wherein the zeolitic framework comprises a d6r unit.

7. The catalyst composition of claim 1, wherein the zeolitic framework is selected from AEI, CHA, AFX, ERI, KFI, LEV, a CHA-AEI intergrowth, and combinations thereof.

TABLE 3

| | | | Aging: | | | |
|---|---|---|---|---|---|---|
| | | | 650° C./50 h/10% H$_2$O | | 800° C./16 h/10% H$_2$O | |
| | | extra-framework | NO$_x$ conversion (%) | | NO$_x$ conversion (%) | |
| Testing Sample | Calcination Conditions/time/furnace* | aluminum (%) | 200° C. | 600° C. | 200° C. | 600° C. |
| 1 | ≈700° C./1 h rotary | 15 | 67 | 82 | 62 | 58 |
| 2 | 500° C./12 h muffle | 10 | 74 | 85 | 62 | 65 |
| 3 | 490° C./12 h muffle | 6 | 76 | 88 | 65 | 64 |

*The rotary furnace conditions are again best estimates.

8. The catalyst composition of claim 1, wherein the zeolitic framework is CHA.

9. The catalyst composition of claim 8, wherein the molecular sieve is an aluminosilicate zeolite.

10. The catalyst composition of claim 1, wherein the metal is present in the catalyst composition in an amount of from about 0.01% to about 15.0% by weight, based on the total weight of the metal-containing molecular sieve, calculated as metal oxide.

11. The catalyst composition of claim 1, wherein the metal is copper, iron, or a combination thereof.

12. The catalyst composition of claim 11, wherein copper metal is present in the molecular sieve in an amount of from about 0.01% to about 10.0% by weight of final metal-containing zeolite, calculated as copper oxide (CuO).

13. The catalyst composition claim 1, wherein the molecular sieve further comprises a promoter metal selected from the group consisting of alkali metals, alkaline earth metals, transition metals in Groups IIIB, IVB, VB, VIB VIIB VIIIB, IB, and IIB, Group IIIA elements, Group IVA elements, lanthanides, actinides, and a combination thereof.

14. A catalyst article comprising a catalyst substrate having a plurality of channels adapted for gas flow, each channel having a wall surface in adherence to a catalytic coating comprising the catalyst composition of claim 1.

15. The catalyst article of claim 14, wherein the catalyst substrate is a honeycomb comprising a wall flow filter substrate or a flow through substrate.

16. The catalyst article of claim 14, wherein the catalytic coating is present on the substrate with a loading of at least about 1.0 g/in$^3$.

17. A method for reducing $NO_x$ level in an exhaust gas comprising contacting the gas with a catalyst for a time and temperature sufficient to reduce the level of $NO_x$ in the gas, wherein the catalyst is a catalyst composition according to claim 1.

18. The method of claim 17, wherein the $NO_x$ level in the exhaust gas is reduced to $N_2$ and water at a temperature between 200° C. to about 600° C.

19. The method of claim 18, wherein the $NO_x$ level in the exhaust gas is reduced by at least 60% at 200° C.

20. The method of claim 19, wherein the $NO_x$ level in the exhaust gas is reduced by at least 50% at 600° C.

21. An emission treatment system for treatment of an exhaust gas stream, the emission treatment system comprising:
  i.) an engine producing an exhaust gas stream;
  ii.) a catalyst article according to claim 16 positioned downstream from the engine in fluid communication with the exhaust gas stream and adapted for the reduction of $NO_x$ within the exhaust stream to form a treated exhaust gas stream; and
  iii.) an injector adapted for the addition of a reductant to the exhaust gas stream to promote reduction of $NO_x$ to $N_2$ and water as the exhaust gas stream is exposed to the catalyst article.

22. The emission treatment system of claim 21, further comprising a diesel oxidation catalyst.

23. The emission treatment system of claim 21, wherein the reductant comprises ammonia or an ammonia precursor.

* * * * *